(12) United States Patent
Geyer et al.

(10) Patent No.: US 8,626,415 B2
(45) Date of Patent: Jan. 7, 2014

(54) ELECTRONIC BRAKING SYSTEM AND METHOD FOR OPERATING AN ELECTRONIC BRAKING SYSTEM

(75) Inventors: Bernd Geyer, Frankfurt (DE); Kai Schade, Oberursel (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 97 days.

(21) Appl. No.: 13/387,387

(22) PCT Filed: Jul. 22, 2010

(86) PCT No.: PCT/EP2010/060596
§ 371 (c)(1),
(2), (4) Date: Jan. 27, 2012

(87) PCT Pub. No.: WO2011/012522
PCT Pub. Date: Feb. 3, 2011

(65) Prior Publication Data
US 2012/0130615 A1   May 24, 2012

(30) Foreign Application Priority Data

Jul. 21, 2009 (DE) .......... 10 2010 031 608
Jul. 31, 2009 (DE) .......... 10 2009 035 630

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC .............. 701/70; 701/36; 701/71; 188/282.2; 303/199; 303/20

(58) Field of Classification Search
USPC ........ 701/36, 70–92; 188/1.11 E, 282.2, 137, 188/156, 158, 171, 182; 303/124, 199, 20, 303/3, 15, 16, 17
See application file for complete search history.

(56) References Cited

U.S. PATENT DOCUMENTS

| 5,402,394 | A | * | 3/1995 | Turski ............................. 368/10 |
| 6,157,217 | A | * | 12/2000 | Zittlau et al. .................... 326/93 |
| 6,282,954 | B1 | * | 9/2001 | Ott et al. ......................... 73/488 |
| 6,842,808 | B2 | * | 1/2005 | Weigl et al. .................. 710/117 |
| 2009/0292434 | A1 | * | 11/2009 | Blaser ............................. 701/70 |

FOREIGN PATENT DOCUMENTS

| DE | 10 12 3568 | 11/2002 |
| DE | 10 2006 024 957 | 12/2007 |

(Continued)

OTHER PUBLICATIONS

International Search Report—PCT/EP2010/060596—Nov. 15, 2010.

*Primary Examiner* — Rami Khatib
(74) *Attorney, Agent, or Firm* — Brinks Gilson & Lione (57) ABSTRACT

The invention relates to an electronic braking system (50) for motor vehicles (60), having at least one wheel brake (7, 8, 9, 10) actuated by an electromechanical actuator (11, 12), wherein the electromechanical actuator (11, 12) is associated with an electronic control and/or regulating unit (WCU) (18, 19, 20) in which a data processing program for controlling and/or regulating the electromechanical actuator (11, 12) is executed. The system further having a data bus, in particular a CAN data bus, associated with the electronic control and/or regulating unit (ECU) (18, 19, 20). In the braking system a temporal coordination is achieved between an electronic control and regulating unit (18, 19, 20) associated with an electromechanical actuator (11, 12) and an additional control and regulating unit of the braking system. This end, the loop time of the data processing program for controlling and/or regulating the electromechanical actuator (11, 12) may be altered via the data bus.

13 Claims, 3 Drawing Sheets

(56) References Cited

FOREIGN PATENT DOCUMENTS

| DE | 10 2006 032 726 | 1/2008 |
| DE | 10 2007 028 002 | 3/2008 |
| WO | WO 98/36956 | 8/1998 |
| WO | WO 2008/155341 | 12/2008 |

* cited by examiner

ELECTRONIC BRAKING SYSTEM AND METHOD FOR OPERATING AN ELECTRONIC BRAKING SYSTEM

CROSS REFERENCE TO RELATED APPLICATIONS

This application claims priority to German Patent Application Nos. 10 2009 035 630.4, filed Jul. 31, 2009, 10 2010 031 608.3, filed Jul. 21, 2010, and PCT/EP2010/060596, filed Jul. 22, 2010.

FIELD OF THE INVENTION

The invention relates to an electronic brake system, in particular for motor vehicles, having at least one wheel brake which can be activated by an electromechanical actuator. The system includes an electronic open-loop and/or closed-loop control unit (WCU), in which a data processing program for performing open-loop and/or closed-loop control of the electromechanical actuator is executed, is assigned to the electromechanical actuator. The system further having a databus, in particular a CAN (Controller Area Network) databus with which the electronic open-loop and/or closed-loop control unit (WCU) which is assigned to the electromechanical actuator is connected to at least one further open-loop and/or closed-loop control unit (ECU), in particular a central electronic or electrohydraulic open-loop and/or closed-loop control unit. The invention also relates to an associated operating method and to an associated motor vehicle.

BACKGROUND AND SUMMARY OF THE INVENTION

Future motor vehicle brake systems are expected to increasingly have wheel brakes which can be activated electromechanically. Known wheel brakes which can be activated electromechanically comprise, in addition to the electromechanical actuator, an electronic open-loop and closed-loop control unit (wheel control unit, WCU). A data processing program (application/software) which determines, from various input data items, control signals for actuating the electromechanical actuator in order to generate the desired braking force, is usually executed in the electronic open-loop and closed-loop control unit.

The international patent application WO 2008/155341 A1 discloses a combined brake system with wheel brakes which can be activated hydraulically on a first axle and wheel brakes which can be activated electromechanically on a second axle. In this context, an electrohydraulic open-loop and closed-loop control unit is assigned to the first vehicle axle, and an electronic open-loop and closed-loop control unit is assigned to each electromechanical actuator of the second axle. The open-loop and closed-loop control units are connected to one another via data buses.

When there is a classic functional division in respect of the hardware components and software components, the assigned processor-based control unit (WCU) operates on the basis of sensor-support control. This control is capable of performing a maximum number of iterations (calculations) per second. For example, an iteration rate of 200 $s^{-1}$ corresponds to a software loop time of 5 ms. The actuation and closed-loop control processes usually occur with the timing pattern of this software loop time.

Known purely electrohydraulic brake systems usually have a central electrohydraulic open-loop and closed-loop control unit (HECU), for example an ESP assembly (ESP: electronic stability program), which actuates valves on the basis of their software loop time in order to control the brake pressure and therefore decelerate the vehicle.

Combined brake systems with wheel brakes (EMB) which can be activated hydraulically and electromechanically, such as, for example, the brake system disclosed in WO 2008/155341 A1, have, on the other hand, for example an ESP assembly as a central controller (master) which transmits communication messages to other nodes (slaves) of the network (for example to the WCU) on the basis of the (its) software loop time, and as it were predefines the setpoint variables (for example for the braking force which is to be set) by "remote control". In this case, the valves (braking force) are no longer controlled directly (centrally) on a wheel-specific basis. Instead, the ESP assembly transmits the setpoint tension force to the EMB using communication messages, after which the respective EMB autonomously adjusts the actual tensioning force correspondingly. The electric brake is therefore part of a composite system.

An obvious disadvantage of such brake systems in the prior art is the loose chronological relationship between the software loop times of the ESP central controller (master) and the EMB (slave). If these are not matched to one another, a message which is sent by the central controller and received by the EMB can, under certain circumstances, fail to be taken into account for a certain time before the EMB follows the changed tensioning force setpoint value since the current iteration loop (of the software) still has to be ended. This delay has to be considered relevant for safety when there is a sudden braking request: the braking process can, for example, be initiated with an overall delay in a hazardous situation. In other cases, the tensioning force setpoint values can be set with a delay and at different times, as a result of which the stability of the vehicle may be compromised during the braking process.

The problems which are relevant for safety also arise during the sending of the tensioning-force actual values which are logically already present in the form of messages after transmission from the EMB to the ESP central controller but which firstly have to wait, owing to the less than optimum time of reception, for the ending of the current software loop of the central controller before they are taken into account by the ESP software. The highly clocked iteration rate of 200 or more calculations per second are effectively reduced in terms of the order of magnitude of the additional lag times along the forward channel and back channel within the grouping of a system with distributed open-loop and closed-loop control units without a fixed chronological relationship between the distributed nodes. The deceleration capability of the vehicle decreases accordingly.

The invention is therefore based on the object of making available an electronic brake system in which the timing of one electronic open-loop and closed-loop control unit which is assigned to an electromechanical actuator and that of a further open-loop and closed-loop control unit of the brake system are coordinated. Furthermore, an associated operating method and a motor vehicle with such a brake system are intended to be made available.

With respect to the brake system, the above-mentioned object is achieved according to the invention in that the loop time of the data processing program for performing open-loop and/or closed-loop control of the electromechanical actuator can be changed by means of the databus.

The terms "loop time" and "software loop time" are used according to the invention to refer to the transit time of a (main) loop of the application (software) of the corresponding open-loop and/or closed-loop control unit. Such a "loop time" is usually in the range of several milliseconds (for example 10 ms).

Advantageous refinements of the invention are the subject matter of the dependent claims.

The invention is based on the idea that in brake systems which are constructed according to the master/slave principle and in which a master unit communicates with a plurality of slaves which are assigned to brakes which can be activated electromechanically and in which the slaves, as it were, independently bring about the application of the brakes at the instigation of messages from the master, the time period between the transmission of the setpoint tensioning force by the master and the setting of the tensioning force by the respective slave should be kept as low as possible. Given an excessively long time interval between the times at which the master unit determines the setpoint tensioning forces and the times at which said forces are set by the slaves, adjustment of the tensioning forces with a minimum phase offset which is as constant as possible is made more difficult to an extreme degree. In extremely hazardous situations in which a rapid time sequence of different tensions has to be set, the actual tensioning forces and setpoint tensioning forces can get out of phase to such an extent that the vehicle cannot be stabilized enough or be brought to a standstill in good time.

The messages of the master unit should therefore arrive at the slaves within the software loop time at which they can be evaluated and processed substantially without delay, that is to say as it were in a setpoint arrival time window. The dispatch time of the messages of the master and the setpoint arrival time window should therefore be, as continuously as possible, "in phase" with one another. Such a rigid phase relationship is usually not present during normal and unsynchronized operation of the master and slaves.

As has now been recognized, such synchronization can be achieved by virtue of the fact that the software loop time of the respective slave can be changed, over one or more cycles, specifically until the arrival of the messages of the master unit occurs at the setpoint arrival time window of the slave or slaves. This adaptation should take place via a databus which connects the master unit to the respective slave unit. That is to say the software loop time of an electronic open-loop and/or closed-loop control unit which is assigned to an electromechanical actuator should be capable of being changed by means of the databus, in particular the CAN databus. However, other means which are external in relation to the slave unit can also be applied and are conceivable. For example, a separate clock line or separate trigger line, which, for example, conducts cyclically changing patterns and therefore impresses the time window, can be used.

It is therefore proposed, for example, to carry out synchronization of the software loop times of nodes in a distributed system with respect to a common reference. As a result, a certain phase rigidity is achieved within a specific framework.

In one preferred embodiment of the brake system, the electronic open-loop and/or closed-loop control unit (WCU) which is assigned to the electromechanical actuator comprises a means which adapts the loop time of the data processing program for performing open-loop and/or closed-loop control of the electromechanical actuator to the arrival of messages which have a time stamp and are received via the databus. The arrival time of the messages can be positioned by these means in a setpoint arrival time window of the WCU, which ensures immediate processing of the messages. It is therefore possible, when setpoint tensioning forces are transmitted, to adjust said forces immediately and the actual tensioning force values are transmitted back to the central open-loop and closed-loop control unit immediately hereafter. This means can comprise, for example, the execution of a difference measurement, wherein the chronological offset between the actual arrival time and the ideal position within the setpoint arrival time window is measured.

The messages with a time stamp advantageously additionally comprise further data. In this way, these additional data do not have to be transmitted by separate messages, with the result that the number of messages which have to be transmitted in a certain time interval is kept as low as possible.

For effective communication and synchronization, the messages with a time stamp are advantageously sent periodically, in particular at equidistant times, by the further open-loop and/or closed-loop control unit (ECU). Data messages can be defined unambiguously in terms of content, identifier and sending time, and therefore function as a time stamp.

The electronic open-loop and/or closed-loop control unit (WCU), which is assigned to the electromechanical actuator, itself advantageously sends a message, in particular exclusively, immediately after the reception of a message with a time stamp. This measure allows the time interval between the dispatch of this message and the next reception of a message with a time stamp to be kept as long as possible, which permits collisions of these messages with one another to be avoided.

In one preferred embodiment of the brake system, the loop time of the data processing program for performing open-loop and/or closed-loop control of the electromechanical actuator is shortened or lengthened as a function of the received time stamps for a predefined number of loops. As a result, the setpoint reception window can be chronologically shifted with respect to the time stamps, i.e. to a certain extent the setpoint reception window can be wound forward and back with respect to the time stamps. The application loop time which is lengthened or shortened in a time-limited fashion is advantageously varied here in terms of a chronological framework which can be ignored with respect to the control: the loop time is preferably lengthened or shortened by significantly less than 10% in each case.

The further open-loop and/or closed-loop control unit is advantageously a central electronic or electrohydraulic open-loop and/or closed-loop control unit which is suitable for directly or indirectly controlling all the wheel brakes.

The further, in particular the central, open-loop and/or closed-loop control unit as well as each of the electronic open-loop and/or closed-loop control units assigned to the electromechanical actuators each preferably have separate intelligence and each comprise at least one microcomputer. The electronic open-loop and/or closed-loop control units (WCU) which are assigned to the electromechanical actuators are advantageously each arranged in the vicinity of the associated wheel.

The brake system preferably comprises wheel speed sensors whose signals are fed to the central electronic or electrohydraulic open-loop and/or closed-loop control unit (ECU) and/or the electronic open-loop and closed-loop control units (WCU) of the electromechanical actuators.

The brake system of this invention advantageously includes a central electronic or electrohydraulic open-loop and/or closed-loop control unit (ECU) and at least two wheel brakes which can each be activated by an electromechanical actuator and each have an electronic open-loop and/or closed-loop control unit (WCU) which is assigned to the electromechanical actuators, wherein each electronic open-loop and/or closed-loop control unit (WCU) which is assigned to the electromechanical actuators is indirectly or directly connected to the central open-loop and/or closed-loop control unit (ECU) via a databus, in particular a CAN (Controller Area Network) databus. The central open-loop and/or closed-loop control unit (ECU) at least temporarily actuates at least one of the electronic open-loop and/or closed-loop control unit (WCU) which is assigned to the electromechanical actuators.

According to one advantageous development, the brake system comprises two wheel brakes which are assigned to a second vehicle axle and can be activated by electromechanical actuators, as well as two wheel brakes which are assigned to a first vehicle axle and can be activated electromechanically or hydraulically, wherein the central electronic or electrohydraulic open-loop and/or closed-loop control unit (ECU) is designed to perform closed-loop control of the wheel brakes which are assigned to the first vehicle axle.

The central open-loop and/or closed-loop control unit (ECU) is preferably embodied as an electrohydraulic open-loop and closed-loop control unit (HECU). Said electrohydraulic open-loop and closed-loop control unit advantageously has a device for carrying out an anti-lock brake function (ABS) and/or a vehicle movement dynamics stability function (ESP). Corresponding braking force prescriptions are transmitted from the central open-loop and/or closed-loop control unit (ECU) via the databus (CAN bus) to the electronic open-loop and/or closed-loop control units (WCU) which are assigned to the electromechanical actuators.

With respect to the method, the above-mentioned object is achieved according to the invention in that the loop time of the data processing program for performing open-loop and/or closed-loop control of the electromechanical actuator can be changed by means of the databus. The loop time is advantageously adapted to messages with time stamps which are received via the databus.

The software of a mechatronic wheel brake actuator (electromechanical brake, EMB) is influenced in its chronological processing sequence preferably via external means, for example the bus communication.

The application loop time of the controlling software of the electromechanical brake is advantageously synchronized with fixed time stamps in the form of received CAN messages. These CAN messages are sent by the sender periodically or even at strictly equidistant times.

According to one preferred development of the method of this invention, the electromechanical brake sends its CAN message immediately in reaction to a received CAN message. This prevents a collision with the next reception message and therefore ensures that the messages of the sender which function as time stamps are sent at equidistant times (owing to the now mentioned freedom from collision). The possibility of arbitrating between messages, which is permitted according to the CAN specification, is not used.

In one advantageous embodiment of the method, messages with a time stamp are sent recurrently by the central open-loop and/or closed-loop control unit (ECU), in particular at a permanently predefined time interval, to the electronic open-loop and/or closed-loop control unit (WCU) which is assigned to the electromechanical actuator. Said electronic open-loop and/or closed-loop control unit (WCU) particularly preferably evaluates the arrival times of the messages in order to bring about synchronization with the central open-loop and/or closed-loop control unit (ECU).

The central open-loop and/or closed-loop control unit (ECU) at least temporarily actuates the electronic open-loop and/or closed-loop control unit (WCU) which is assigned to the electromechanical actuator, for example the central open-loop and/or closed-loop control unit (ECU) prescribes setpoint values for the braking force to be adjusted to the electronic open-loop and/or closed-loop control unit (WCU) which is assigned to the electromechanical actuator.

With respect to the motor vehicle, the above-mentioned object is achieved according to the invention with an above-mentioned brake system.

The advantages of the invention are, in particular, the fact that for changing the software loop time of the data processing program for performing open-loop and/or closed-loop control of an electromechanical actuator by means of a databus essentially delay-free and lag-time-free processing of transmitted messages can take place and therefore an immediate reaction to the content of these messages can occur.

BRIEF DESCRIPTION OF THE DRAWINGS

An exemplary embodiment of the invention will be explained in more detail on the basis of a drawing, in which, in a highly schematic illustration.

Identical parts are provided with the same reference symbols in all the figures.

DETAILED DESCRIPTION OF THE INVENTION

Figure 1:
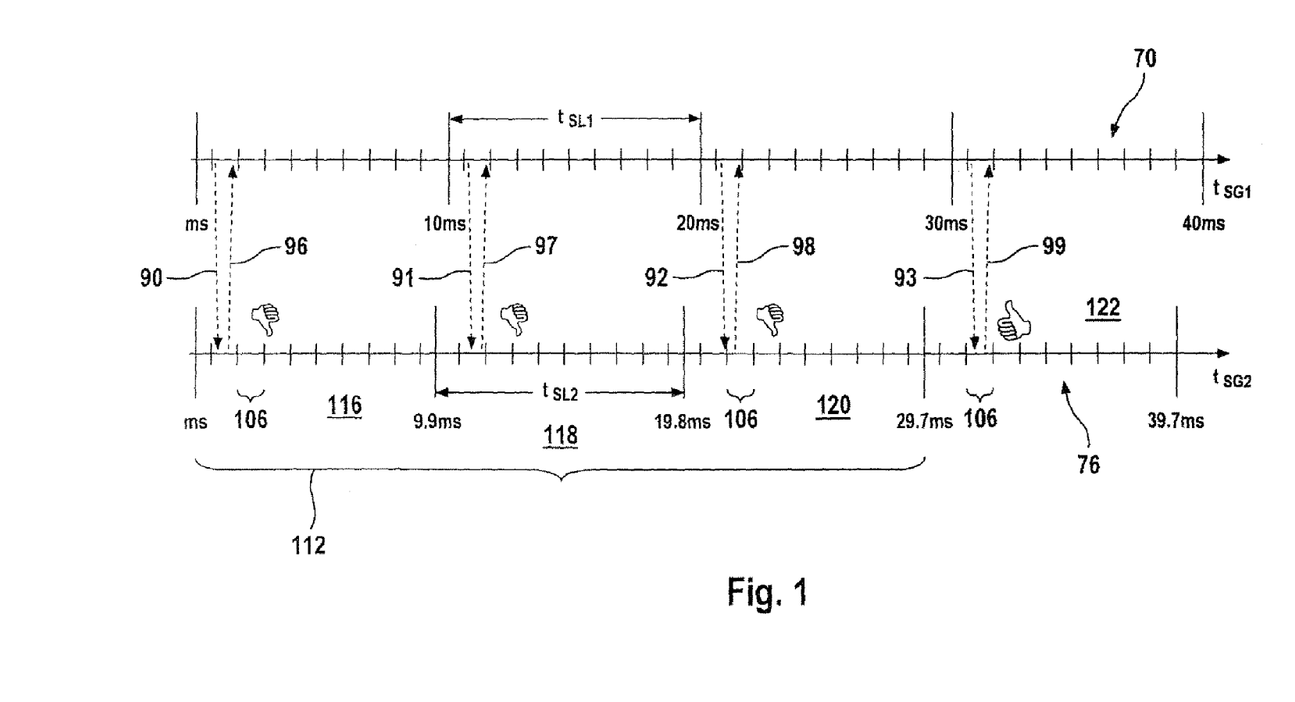
FIG. 1 shows a method for operating an electronic brake system in a preferred embodiment.

In the method of this invention, illustrated in FIG. 1, for operating a brake system, messages are exchanged between a first control device, the master (not illustrated), and a second control device, the slave (not illustrated). The associated time axis 70, in which the time $t_{SG1}$ is plotted, is illustrated for the first control device or control device 1, and the time axis 72, in which the time $t_{SG2}$, is plotted, is illustrated for the second control device or control device 2. In both cases, the loop times are also shown, $t_{SL1}$ for the control device 1, and $t_{SL2}$ for the control device 2.

The first control device sends interrogation messages 90, 91, 92, and 93 to the second control device at regular intervals. The control device 2 sends response messages 96, 97, 98, and 99 to the first control device.

The interrogation messages 90, 91, 92, and 93 which are sent by the first control device are intended to reach the second control device in a setpoint arrival time window 106. The setpoint arrival time window 106 is configured in such a way that interrogation messages which reach the second control device within this window can be processed directly and substantially without delay.

The databus is configured as a CAN bus in the method illustrated in FIG. 1. When a CAN-supported network is used, for example the periodic transmission (in particular strictly at equidistant times) of messages by the master (for example central controller, here control device 1) is used for synchronization. The interrogation messages 90, 91, 92, and 93 which are transmitted continuously, at equal intervals, serve equally for the transmission of data and the setting of time stamps.

These interrogation messages 90, 91, 92, and 93 which are received periodically from control device 2 and from further slaves (further open-loop and closed-loop control units) are evaluated in terms of their arrival time relative to the software loop time $t_{SL2}$ and compared with the (predefined) desired arrival time window or setpoint arrival time window 106. A chronological offset is compensated by corresponding successive adaptation of the software loop times $t_{SL2}$ until the ideal phase relationship between the software loop time of the slave (for example WCU), in the present case of control device 2, and the software loop time of the master (for example ECU), in the present case of control device 1, is brought about. The transmission latency is therefore minimal and the reaction speed is at a maximum, the phase offset is virtually constant, the application of the controller coefficients of the controller with respect to the distance is simplified and the best control performance is achieved, which means the shortest braking distances.

For example, the loop time can be defined and generated by means of a timer (which is implemented for example as a hardware module of a microcontroller). When the necessary adaptation in the direction of the setpoint arrival window has occurred, the timer can be switched over to a limited degree in its counting method/working method for a specific period. This can be achieved, for example, by means of a changed minimum/maximum value and/or an adapted counting speed.

In order to ensure that the messages—the interrogation messages 90, 91, 92, and 93; which function as time stamps do not collide with other messages, a collision-free communication method is thus employed in the present exemplary embodiment. For this purpose, an interrogation-response-lag time-interrogation-response-lag time-principle is applied. As is apparent from FIG. 1, the master (control device 1, for example central controller) transmits in each case one interrogation message 90, 91, 92, and 93 (request) of defined length at equidistant time intervals—this is also referred to as time based transmission (of requests). The slave (control device 2, for example WCU) transmits in each case one response message 96, 97, 98, and 99 (response), also of a defined length, in each case directly after reception of the request message or of the interrogation message 90, 91, 92, 93—this is referred to as event based transmission (of responses). The duration of the transmission of the response or response message 96, 97, 98, and 99 never exceeds the duration of the interval between the requests or interrogation messages 96, 97, 98, and 99. This ensures that requests and responses never collide, and this actively supports the synchronization.

For the purpose of synchronizing the software loop time $t_{SL1}$ of the control device 1 and of the software loop time $t_{SL2}$ of the control device 2, the control device 2 (slave, for example WCU) shortens its software loop time $t_{SL2}$ in each cycle until the message which constitutes or contains the time stamp because, in terms of its arrival time, is within the (predefined) desired arrival time window or setpoint arrival time window 106. Four cycles 116, 118, 120, and 122 whose chronological length corresponds in each case to the software loop time $t_{SL2}$ are illustrated. In the first cycle 116, the control device 2 shortens its software loop time $t_{SL2}$ by 0.1 ms from 10 ms to 9.9 ms. This ensures that the time at which the control device 2 receives the interrogation message 91 is pushed back in relation to the chronological start of its cycle. Further chronological shifts by 0.1 ms occur in the cycles 118 and 120.

In the fourth cycle, cycle 122, the interrogation message 93 reaches the control device 2 in the setpoint arrival time window 106. Since the software loop times $t_{SL1}$ and $t_{SL2}$ coincide in the present case, the reception of the interrogation messages also takes place in each case in the setpoint arrival time window 106 in the following cycles. The algorithm for monitoring and, if appropriate, recovering the synchronization is ideally permanently active. Adaptation is initiated as required when a loss of synchronization (the interrogation messages leave the setpoint arrival time window) has been detected. This may, under certain circumstances, become necessary owing to unavoidable causes such as frequency inaccuracies due to component tolerances of the clock-generating components (quartz), frequency drifts of the quartz clocks owing to temperature fluctuations, brief local or global voltage failures (for example an insecure contact on the plug) on one or more control devices. The entirely usual case of the need for synchronization is the "upsynchronization" after a cold start/initial start of the vehicle (switching on of the ignition), when the grouping of control devices was previously deactivated/switched off/sleeping.

In other situations, the software loop time $t_{SL2}$ can also be lengthened over a number of cycles in order to match arrival times and setpoint arrival time windows. Combinations of lengthening and shortening are also possible. As explained in conjunction with FIG. 1, in order to synchronize the application loop time of the controlling software of the EMB (control device 2), with the external timestamps (CAN messages) which are transmitted by the control device 1, the application loop time or software loop time is briefly lengthened or shortened. A type of "fast forward or rewinding effect" of the time bases of the two control devices with respect to one another is thus achieved. The application loop time which is lengthened or shortened in a chronologically limited fashion within the cycles 116, 118, 120 (characterized by a curly bracket 112) is varied within a chronological framework which is negligible for the control ($<<10\%$).

Figure 2:
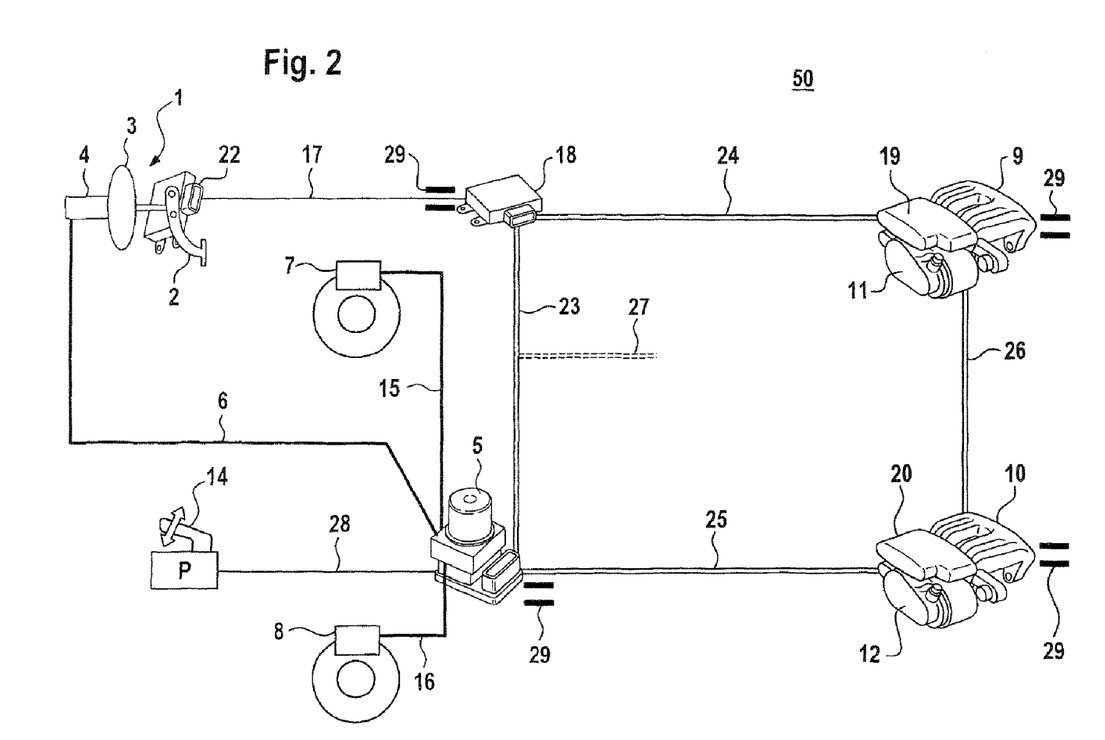
FIG. 2 shows a brake system in a preferred embodiment, which brake system is operated with the method from FIGS. 1.

FIG. 2 illustrates a brake system 50 in a preferred embodiment. The brake system 50 has essentially an activation unit 1 which can be activated by means of a brake pedal 2. The activation unit 1 is itself composed of a pneumatic brake booster or an underpressure brake booster 3 as well as a master brake cylinder 4 which is connected downstream of the underpressure brake booster 3 and to which an electrohydraulic open-loop and closed-loop control unit 5 is connected by means of a hydraulic line 6. Wheel brakes 7 and 8 which can be activated hydraulically by means of hydraulic lines 15 and 16, and which, in the example shown, are assigned to a first vehicle axle, for example a front axle, are connected to the electrohydraulic open-loop and closed-loop control unit 5.

As is also apparent from FIG. 2, a second vehicle axle, for example the rear axle, is assigned wheel brakes 9 and 10 which are activated by electromechanical actuators 11 and 12 in accordance with the hydraulic pressure which is applied to the wheel brakes 7 and 8 which can be activated hydraulically. The aforementioned hydraulic pressure is determined using pressure sensors (not shown) which are integrated into the electrohydraulic open-loop and closed-loop control unit 5. The wheel brakes 9 and 10 which can be activated electromechanically are actuated on the basis of this pressure value, i.e. an application force of the wheel brakes 9 and 10 is adjusted taking into account a braking force distribution function between the front and rear axles. Furthermore, the brakes 9 and 10 which can be activated electromechanically are actuated in accordance with the activation travel of the brake pedal 2, i.e. according to the driver's deceleration request. For this purpose, the activation travel of the brake pedal 2 is determined using a pedal travel sensor 22 which is preferably of redundant design. The wheel brakes 9 and 10 which are assigned to the rear axle are actuated in a decentralized fashion by means of one electronic open-loop and closed-loop control unit (WCU) 19 and 20 each.

As is only indicated schematically in FIG. 2, the illustrated brake system 50 or the brake installation is equipped, for example, with a parking brake functionality. For this purpose, the wheel brakes 9 and 10 which can be activated electromechanically have parking brake devices (not shown) with which the wheel brakes 9 and 10 can be locked in the applied state. The parking brake devices can be actuated using an operator control element 14 which is embodied, for example, as a pushbutton key and has three switched positions for the instructions "apply", "neutral" and "release".

For example, the output signals of the pedal travel sensor 22 are fed via a signal line 17 to a further electronic open-loop and closed-loop control unit 18 which can be formed, for example, by a chassis controller. The open-loop and closed-loop control unit 18 is an optional component of the brake system 50 which can be dispensed with. The signal line 17 can be embodied in this case as two separate signal lines, wherein the one signal line is connected directly to the electronic open-loop and closed-loop control unit 19, and the other signal line is connected directly to the electronic open-loop and closed-loop control unit 20.

A first high speed bus 23 forms a direct connection between the electrohydraulic open-loop and closed-loop control unit (HECU) 5 mentioned above and the further (optional) electronic open-loop and closed-loop control unit 18, which is directly connected by means of a further high speed bus 24 to the electronic open-loop and closed-loop control unit 19 of the electromechanical actuator 11. The high speed buses 23 and 24 are usually identical in an embodiment of the brake system without the open-loop and closed-loop control unit 18. A second signal line 28 serves to transmit signals between the parking brake operator control element 14 and the electrohydraulic open-loop and closed-loop control unit (HECU) 5, which is directly connected to the electronic open-loop and closed-loop control unit 20 of the electromechanical actuator 12 by means of a third high speed bus 25, with the result that the output signals of the parking brake operator control element 14 are fed to the specified electronic open-loop and closed-loop control unit 20. A fourth high speed bus 26 forms a direct connection between the electronic open-loop and closed-loop control units 20 and 19 of the electromechanical actuators 12 and 11.

The line 27 which is drawn with dashes represents an optionally present line to, if appropriate, further open-loop and closed-loop control units. All the power supply connections of the elements shown in FIG. 2 are denoted by the reference symbol 29.

Alternatively it is possible (not illustrated in a figure) that there is no electronic open-loop and closed-loop control unit 18 present and the transmission of signals between the pedal travel sensor 22 and the electronic open-loop and closed-loop control units 19 and 20 of the electromechanical actuators 11, 12 takes place via signal lines, while the HECU 5 is directly connected to the electronic open-loop and closed-loop control unit 19 of the electromechanical actuator 11 via a high speed bus.

The high speed buses 23 to 26 are preferably a CAN data bus.

Figure 3:
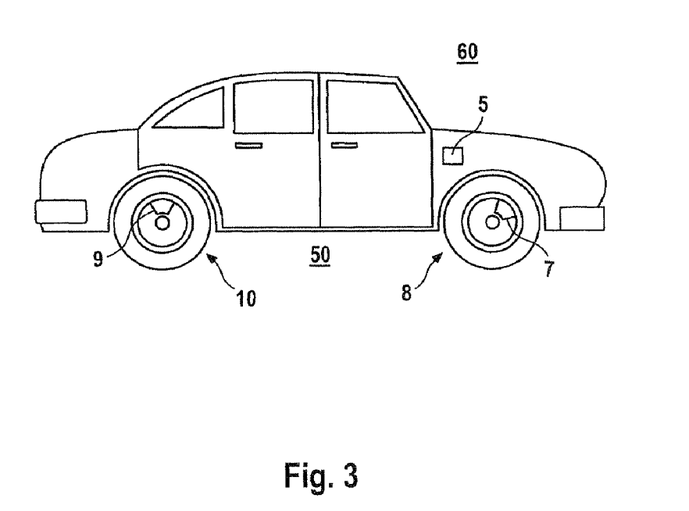
FIG. 3 shows a motor vehicle having a brake system according to FIG. 2.

A motor vehicle 60 with the brake system 50 which is illustrated in FIG. 2 and has the open-loop and closed-loop control unit 5 is illustrated in FIG. 3. The wheel brakes 7 and 8 (not illustrated) are hydraulic, and the wheel brakes 9 and 10 (not illustrated) can be activated electromechanically.

While the above description constitutes the preferred embodiment of the present invention, it will be appreciated that the invention is susceptible to modification, variation and change without departing from the proper scope and fair meaning of the accompanying claims.

The invention claimed is:

1. An electronic brake system (50) for motor vehicles (60), comprising at least one wheel brake (7, 8, 9, 10) which can be activated by an electromechanical actuator (11, 12), wherein a first electronic open-loop or closed-loop control unit (WCU) (18, 19, 20), in which a data processing program for performing open-loop or closed-loop control of the electromechanical actuator (11, 12) is executed, is assigned to the electromechanical actuator (11, 12), and a CAN (Controller Area Network) databus with which the electronic first open-loop or closed-loop control unit (WCU) (18, 19, 20) which is assigned to the electromechanical actuator (11, 12) is connected to at least one second central electronic or electrohydraulic open-loop or closed-loop control unit (5), the loop time of the data processing program for performing open-loop or closed-loop control of the electromechanical actuator (11, 12) is configured to be changed via the databus, wherein the first electronic open-loop or closed-loop control unit (WCU) (18, 19, 20) which is assigned to the electromechanical actuator (11, 12) includes means for adapting the loop time of the data processing program for performing the open-loop or closed-loop control of the electromechanical actuator (11, 12) to the arrival of messages which have a time stamp and are received via the databus, wherein the first electronic open-loop or closed-loop control unit (WCU) (18, 19, 20) is configured to adapt the loop time after comparing an arrival time of a message having a time stamp with a predetermined arrival time window of the loop time of the data processing program in the first electronic open-loop or closed-loop control unit (WCU) (18, 19, 20) associated with the electromechanical actuator.

2. The brake system (50) as claimed in claim 1, further comprising in that the messages with a time stamp additionally comprise further data.

3. The brake system (50) as claimed in claim 1, further comprising in that the messages with a time stamp are sent periodically at equidistant times, by the first open-loop closed-loop control unit (ECU) (18, 19, 20).

4. The brake system (50) as claimed in claim 1, further comprising in that the first electronic open-loop or closed-loop control unit (WCU) (18, 19, 20), which is assigned to the electromechanical actuator (11, 12), itself sends a second message immediately after the reception of a first message with a time stamp.

5. The brake system (50) as claimed in claim 1, further comprising in that the loop time of the data processing program for performing open-loop or closed-loop control of the electromechanical actuator (11, 12) is shortened or lengthened as a function of the received time stamps for a predefined number of loops.

6. The brake system (50) as claimed in claim 1 further comprising wheel speed sensors whose signals are fed to the second central electronic or electrohydraulic open-loop or closed-loop control unit (ECU) (5) or the first electronic open-loop and closed-loop control units (WCU) (18, 19, 20) of the electromechanical actuators (11, 12).

7. The brake system (50) as claimed in claim 1 further comprising at least two wheel brakes (7, 8, 9, 10) which can each be activated by one of the electromechanical actuator (11, 12) and each have the first electronic open-loop or closed-loop control unit (WCU) (18, 19, 20) which is assigned to the electromechanical actuators (11, 12), wherein each first electronic open-loop or closed-loop control unit (WCU) (18, 19, 20) which is assigned to the electromechanical actuators (11, 12) is indirectly or directly connected to the second central open-loop or closed-loop control unit via the databus.

8. The brake system (50) as claimed in claim 1 further comprising two of the wheel brakes (7, 8, 9, 10) which are assigned to a second vehicle axle and can be activated by electromechanical actuators (11, 12), as well as two of the wheel brakes (7, 8, 9, 10) which are assigned to a first vehicle axle and can be activated electromechanically or hydraulically, wherein the second central electronic or electrohydraulic open-loop or closed-loop control unit (ECU) (5) is designed to perform closed-loop control of the wheel brakes (7, 8, 9, 10) which are assigned to the first vehicle axle.

9. A motor vehicle having a brake system (50) as claimed in claim 1.

10. A method for operating an electronic brake system (50), of a motor vehicle (60) having at least one wheel brake (7, 8, 9, 10) which can be activated by an electromechanical actuator (11, 12), and a CAN (Controller Area Network) databus, wherein a first electronic open-loop or closed-loop control unit (WCU) (18, 19, 20), in which a data processing program for performing open-loop or closed-loop control of the electromechanical actuator (11, 12) is executed, is assigned to the electromechanical actuator (11, 12), and wherein the first electronic open-loop or closed-loop control unit (WCU) (18, 19, 20), which is assigned to the electromechanical actuator (11, 12), is connected to at least one second open-loop closed-loop control unit (ECU) via the databus, the method comprising the steps of changing the loop time of the data processing program for performing the open-loop or closed-loop control of the electromechanical actuator (11, 12) via the databus, wherein first electronic open-loop or closed-loop control unit (WCU) (18, 19, 20) adapts the loop time of the data processing program for performing the open-loop closed-loop control of the electromechanical actuator (11, 12) for messages which have time stamps and which are received via the databus after comparing an arrival time of a message having a time stamp with a predetermined arrival time window defined by the loop time of the data processing program in the first electronic open-loop or closed-loop control unit (WCU) (18, 19, 20) associated with the electromechanical actuator.

11. The method as claimed claim 10, further comprising in that the messages with a time stamp are sent periodically at equidistant times, by the a second central electronic or electrohydraulic open-loop or closed-loop control unit (5).

12. The method as claimed claim 10, further comprising in that the first electronic open-loop or closed-loop control unit (WCU) (18, 19, 20), which is assigned to the electromechanical actuator (11, 12), itself sends a message immediately after the reception of a message with a time stamp.

13. The method as claimed in claim 10, further comprising in that the loop time of the data processing program for performing the open-loop closed-loop control of the electromechanical actuator (11, 12) is shortened or lengthened as a function of the received time stamps the result of the comparison with the predefined arrival time window for a predefined number of loops.

* * * * *